Patented Mar. 3, 1942

2,275,292

UNITED STATES PATENT OFFICE 2,275,292

COMPOSITION OF MATTER SUITED TO THE TREATMENT OF NASAL ALLERGY AND ASSOCIATED CONDITIONS

Edward Everett Edmondson, Canon City, Colo.

No Drawing. Application November 8, 1940,
Serial No. 364,934

1 Claim. (Cl. 167—58)

My composition of matter consists of a combination of metalic salts of known antiseptic, stimulant and astringent properties, such as cupric sulphate, zinc sulphate and silver nitrate, the named sulphates being so compounded with any suitable solvent by heat treatment that they any suitable solvent by heat treatment that they become miscible with water in all proportions, and also can be easily mixed with other diluents such as starch for use in insufflation and petrolatum to form an ointment.

I prefer to dissolve separately the cupric sulphate and the zinc sulphate in any suitable solvent as glycerol a propenyltrihydroxide whose chemical formula is $CH_2OHCHOHCH_2OH$, or ethylene glycol whose chemical formula is $CH_2OHCH_2OH$ converting each such mixture into a clear solution by heat treatment, and then combine these with an aqueous solution of silver nitrate in such proportions that the first or weakest solution shall contain substantially $\frac{1}{32}$ grain of each of said salts to the fluid ounce of water.

Many drugs have been used in efforts to relieve nasal allergy and associated conditions by intranasal application, among which are some of the acids, such as gallic, tannic and trichloracetic; salts of aluminum, copper, silver, tin, zinc, usually applied singly and by electric modality to produce iontophoresis; alcohol by injection into the nasal sensory nerves; and allergens in the form of pastes for local applications. For quick action in shrinking nasal intumescence the extract of adrenal glands or ephedrin, and similarly acting synthetics are used.

The local application of certain metalic salts in aqueous solution can be tolerated by the nasal membranes only in weak dilution which when used singly fails of satisfactory astringent action on nasal tissues. The use of an electric current to produce iontophoresis of a metalic salt produces permanent impairment of the nasal mucosa which injures its function.

Application of adrenal extracts and ephedrin shrinks tissues quickly but within a very short time the tissues relax and become as edematous as before application, and such use produces a known undesirable systemic effect.

Important objects and advantages of my invention are the production of a composition of matter especially combined for intranasal application in the treatment of nasal allergy and associated conditions, without the necessity for anesthetics or for electric modalities, also without impairment of the nasal mucosa and without systemic reaction.

Other important objects and advantages of my invention are its action in:
1. Reducing the intumescence of the nasal structures,
2. Disinfection of the surfaces of the nasal tissues,
3. Stimulation of a discharge of nasal secretion which may be laden with allergens and other undesirable elements,
4. The development of an increasing tolerance for, and greater immunity against, allergens which produce nasal symptoms.

This is accomplished by so compounding the ingredients of this invention that the astringent action is increased over that of any one or two of the chemicals used in this product, without increasing the irritant properties beyond reasonable toleration in the structures involved in nasal allergy.

I have found that the average person can tolerate in comparative comfort to the anatomic zone involved in nasal allergy, applications of a solution of cupric sulphate, zinc sulphate or silver nitrate, containing about $\frac{1}{32}$ grain of either of said salts to the ounce of water.

I have found that frequent repetition of applications of the said strength of this solution soon increases the tolerance of said anatomic zone till a stronger dosage can be applied without special discomfort, and that by repetition of the said stronger solution a still further increased tolerance can be established in the same anatomic zone. I have also found that this increase of tolerance is progressive to a high degree so that a tolerance for very strong solutions of said salts can be developed.

I have also found that the three said salts can be placed in the amount of about $\frac{1}{32}$ grain of each in the same ounce of water and can be applied to the untreated said anatomic zone with substantially the same tolerance as though one of the said salts alone were so applied, and that the same increase in amounts of the three said salts in each successive stronger solution can be tolerated as well by the patient under treatment as if it were only one of the said salts, and that as high degree of tolerance for the three said salts in solution can be developed as easily as is the case with a single one of the said salts in equal strength in solution.

I also found that the astringence developed in the swollen nasal tissues from the application of all three of said salts in an aqueous solution is much greater than results from the application of any one or two of the said salts in the same amount of diluent. I therefore combine the three said salts in the same diluent, and thereby greatly speed the astringent action on the nasal tissues.

In preparing this composition of matter I prefer to use the ingredients in graduated strengths beginning with the equivalent of about $\frac{1}{32}$ grain of each salt to the ounce of distilled water, and then increase the amount of said salts in each successive strength as can be tolerated by the case under treatment, till in resistant cases more than 30 grains of each of said salts can be used in an ounce of water or other diluent.

I may prefer to make up the preparation in a strong solution, for example a saturated solution of the combined salts in water or other diluent, and then dilute the composition to weaker proportions to suit the tolerance level of the patient.

Good results may be obtained in treating nasal allergy by means of less expensive ingredients having the same pharmacologic action, which may consist of crystalline cupric sulphate and crystalline zinc sulphate dissolved in commercial glycerol or in ethylene glycol as a solvent with the aid of heat treatment. These ingredients are used in substantially the same amounts and proportions as the preferred embodiment of my invention.

In order to aid in prolonging the suspension of the silver nitrate in the finished solution I may pass a current of direct (galvanic) electricity through the silver solution by suitable electrodes connected with a galvanic or direct current generator of any of the approved types, activating the solution by a current from the above named apparatus of not less than 20 milliamps nor more than 30 milliamps for each 16 ounces of the solution for a period of not less than 20 seconds nor more than 30 seconds. This current strength and timing are thought to aid suspension of the metalic salt without altering the silver nitrate molecule in the solution.

Although I have set forth and described herein preferred embodiments of my invention, it is to be definitely understood that I do not desire to limit the application of the invention thereto, and any change or changes may be made in the components and the manner of assembling the same, within the spirit of the invention and the scope of the subjoined claim.

I am aware that prior to my invention metals and metalic salts have been used intranasally by means of electric currents and also with the application of heat, as well as high strength solutions requiring preliminary anesthetic, therefore I do not claim such combinations broadly, but I claim:

A composition of matter for the treatment of nasal allergy consisting of a solution of cupric sulphate and zinc sulphate in glycerol mixed with a solution of silver nitrate in water, the solution containing substantially equal amounts of the metalic salts and adapted to be used in suitably graduated dilutions for application to the mucous membranes involved in nasal allergy and associated conditions.

EDWARD EVERETT EDMONDSON.